Figure 1:
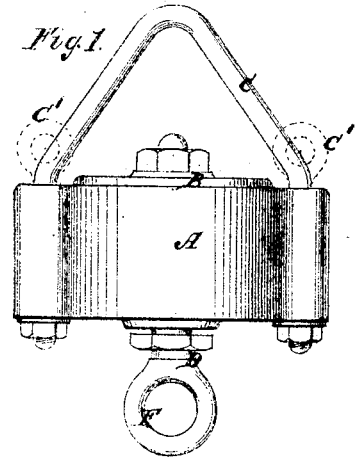

F. E. DUCKHAM.
Improvement in Hydrostatic Weighing Machine.
No. 123,621. Patented Feb. 13, 1872.

Witnesses:
E. Wolff
Alex F. Roberts

Inventor:
F. E. Duckham
per Munn & Co
Attorneys.

123,621

UNITED STATES PATENT OFFICE.

FREDERIC ELIOT DUCKHAM, OF MILLWALL, MIDDLESEX, ENGLAND.

IMPROVEMENT IN HYDROSTATIC WEIGHING-MACHINES.

Specification forming part of Letters Patent No. 123,621, dated February 13, 1872.

*To all whom it may concern:*

Be it known that I, FREDERIC ELIOT DUCKHAM, of Millwall, in the county of Middlesex, England, have invented new and useful Improvements in Hydrostatic Weighing - Machines; and I do hereby declare that the following is a full, clear, and exact description thereof, which will enable others skilled in the art to make and use the same, reference being had to the accompanying drawing forming part of this specification.

My invention relates to improvements in weighing apparatus in which a cylinder containing water or other liquid is employed, the weight of the goods being ascertained by the pressure of the piston on the liquid indicated on a pressure-gauge suitably attached. The object of my invention is to provide a portable apparatus for ascertaining the weight of materials in general, and more particularly heavy goods, during shipment or otherwise, it being also applicable for denoting strains on chains and for other similar purposes. My improved apparatus consists of a smooth-bored cylinder, in which is fitted a piston and rod, made water-tight by means of cupped leathers or other suitable packing. I suspend or attach the apparatus or cylinder by means of a suitable stirrup-piece or sling connected to a link from a crane, or in other convenient position. The goods to be weighed I suspend from the center of the piston by means of a piston-rod which passes through a suitable water-tight gland or packing in the bottom of the cylinder, and to the lower end of which rod the goods to be weighed are attached. A pressure-gauge, preferably that known as the Bourdon gauge, communicates as usual with the liquid in the cylinder for the purpose of indicating the degree of pressure on such liquid, or, in other words, the weight of the goods suspended, or the amount of the strain applied. Instead of employing a central piston-rod passing through the bottom of the cylinder, I may suspend the goods by means of an inverted stirrup-piece, similar to that by which the apparatus is sustained, and which is passed over the top of the piston and down through guides placed on the outside of the cylinder, below which it is united in a link to which the goods may be attached. In this case the top of the piston should be rounded and made sufficiently large to project slightly over the top of the cylinder. Instead of suspending the apparatus by means of a sling or stirrup-piece, as hereinbefore described, it may be mounted in gimbals or trunnions supported by a bracket or shelf, or the apparatus may be bolted securely thereto, the goods being attached as previously described.

When employed to denote strains and for other testing purposes, the cylinder is attached in a vertical or other position, and tension applied to the piston-rod or stirrup-piece, the strain being denoted on the pressure-gauge as before.

Figure 3:
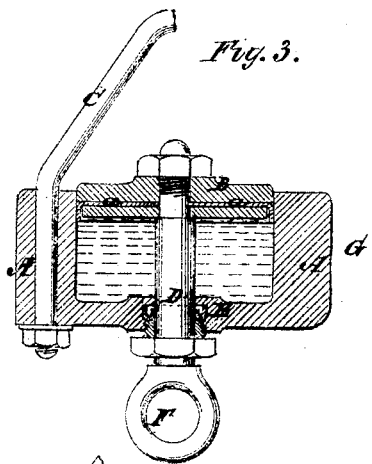
Figure 2:
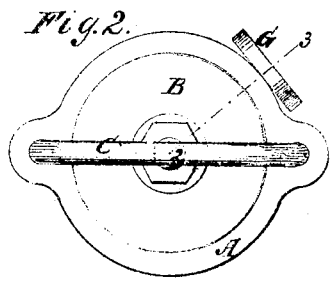
Figure 4:
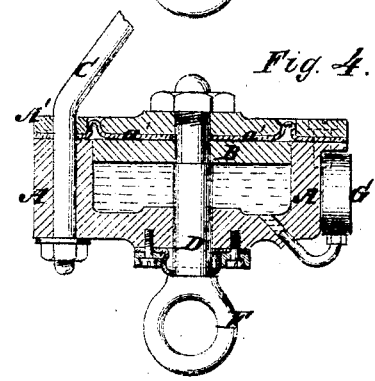
Figure 5:
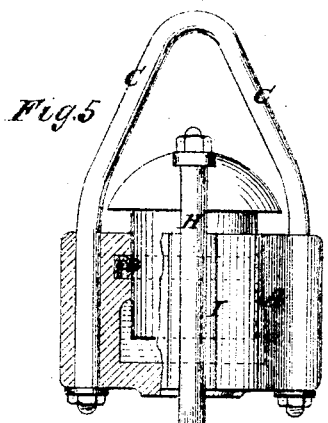
Figure 7:
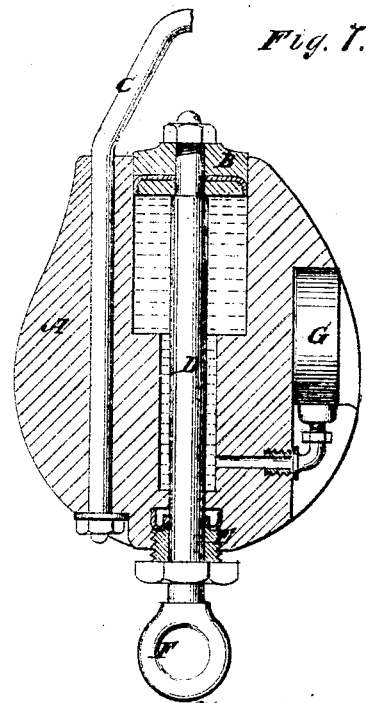
Figure 6:
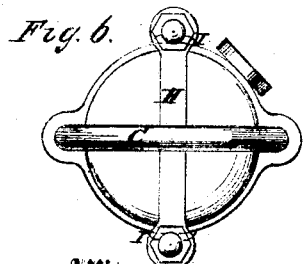

Figure 1 is an outside elevation of one arrangement of the improved portable hydrostatic weighing apparatus of my invention. Fig. 2 is a plan view. Fig. 3 is a sectional elevation of the same taken on the line 1 2 3, Fig. 2. Figs. 4, 5, and 7 are sectional views of modified arrangements of the said improved apparatus. Fig. 6 is a plan of Fig. 5.

Similar letters of reference indicate corresponding parts.

A is the cylinder containing water or other suitable liquid, on the surface of which rests a piston or plunger, B, as usual. To this cylinder A I bolt or otherwise attach a stirrup-piece, C, by which I suspend the apparatus from a crane or in other convenient position. Instead of a stirrup-piece the apparatus may be slung by a chain or chains attached to eye-bolts C' C', connected to the cylinder as shown in red lines. D is the piston-rod passing down through a gland or water-tight packing, E, in the bottom of the cylinder A. At the lower end of this rod D is formed an eye F to which the goods to be weighed are attached. The latter are thus suspended from the center of piston B on which the pressure will be uniformly distributed. G is a pressure-gauge, of any suitable construction, communicating with the liquid in the cylinder, as usual, for the purpose of indicating the weight of the goods suspended from piston-rod D, the connnection being either through the back of the gauge, as shown in Fig. 3, or through the rim of the same, as shown in Fig. 4, or it may be at any other convenient point. The piston B and gland E I make water-tight joints, either by means of cup-leathers of the usual form, as shown at *a a* in Fig. 3, or any other convenient arrangement may be employed—such, for instance, as that illustrated in Fig. 4, in which a diaphragm, $a'$, of leather or other suitable flexible material is securely clamped in the piston, as shown, and attached around its edges to the cylinder A by a metal ring, $A'$, the said diaphragm being slightly bulged around the piston, as shown, to permit of the free movement of the latter.

Figs. 5 and 6 illustrate another arrangement in which the goods are suspended from an inverted stirrup-piece instead of from a piston-rod, D, as before described.

A is the cylinder suspended by rods or chains C, as before. The plunger B is made preferably of the same depth as the interior of the cylinder A, so that should the liquid contained by any chance escape the weight of the goods suspended would be equally borne by the whole apparatus. H is the inverted stirrup-piece passing over the top of plunger B and down through guides I formed on the outside of cylinder A, beneath which the limbs are united in a link, or it may be a swivel-eye or hook, or connected by a chain, from which the goods to be weighed are suspended, as before. In this case the gland E is of course dispensed with, the bottom of the cylinder being formed solid, and the top of the plunger B is rounded and enlarged, as shown, in order to enable the sling H to clear the edge of cylinder A, the pressure on the liquid, or the weight of the goods being indicated on a suitable pressure-gauge, as before. In order to render the gauge capable of indicating heavy weights with precision, I may employ two or more indicators, on the same or separate dials, geared together so as to show the one the greater, and the other the less, denominations of weights, the dial or dials being divided accordingly; or I may obtain the same result by the use of a vernier scale in connection with the indicator.

For the purpose of weighing goods nett I may employ a gauge having a revolving dial-plate operated by a rack and pinion, or by other means, so that when the slinging chains or packages representing the tare are suspended, and the weight of these shown by the indicator, the dial may be adjusted so that when the goods are suspended the indicator will again start from zero, and thus indicate the nett weight of the goods.

In some cases, for instance, where it is desired to ascertain the weight of heavy goods without requiring their removal, or where there is no other convenient power for lifting them, the cylinder of my apparatus may be put in connection with a force-pump, applied as in the case of an ordinary hydraulic jack, by which an additional quantity of liquid may be forced into the cylinder A, so as to lift the piston B sufficiently to raise the goods from the ground, their weight being indicated on the pressure-gauge as before.

I may make the apparatus of any convenient shape externally. Fig. 7 illustrates a modification in this respect, in which a weighing apparatus and overhauling ball are shown combined, applicable for cranes where counter-weights are now used. In this case the gauge is recessed in the thickness of the ball or cylinder A. In the other arrangement shown the gauge may also be similarly disposed to protect it from injury.

This improved weighing apparatus may be used in connection with existing weighing machines to denote the weight of the goods placed thereon in lieu of the counter-weights now employed.

In an ordinary platform-weighing machine, for example, the piston or plunger of the hydrostatic apparatus may be connected to the main lever of the weighing-platform, the cylinder being attached to the lever-handle of the relieving-gear, so as to denote the strain or weights when the latter is depressed by hand to put the machine in action without any manipulation of counter-weights, the dial of the pressure-gauge being graduated to suit.

Having thus described my invention, I claim as new and desire to secure by Letters Patent—

The pendent stirrup C and extension piston-rod D, having eye F on the lower end thereof, combined with and applied to an ordinary gauge, G, fluid-cylinder A, and plunger-piston B, for the purpose of suspending the water-chamber and having the weight in the lower end of the piston, as described.

The above specification of my invention signed by me this 29th day of September, 1870.

FREDERIC ELIOT DUCKHAM.

Witnesses:
A. M. CLARK,
I. O. DEWEY.